(12) United States Patent
Weinstein

(10) Patent No.: US 8,730,863 B2
(45) Date of Patent: May 20, 2014

(54) NETWORK COMMUNICATION SYSTEMS AND METHODS

(75) Inventor: William W. Weinstein, Belmont, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 1103 days.

(21) Appl. No.: 12/207,256

(22) Filed: Sep. 9, 2008

(65) Prior Publication Data

US 2010/0061292 A1 Mar. 11, 2010

(51) Int. Cl.
*H04B 7/14* (2006.01)
*H04B 7/26* (2006.01)
*H04W 88/04* (2009.01)
*H04B 7/155* (2006.01)
*H04W 16/26* (2009.01)
*H04L 1/00* (2006.01)

(52) U.S. Cl.
CPC ............. *H04B 7/2606* (2013.01); *H04W 88/04* (2013.01); *H04B 7/155* (2013.01); *H04W 16/26* (2013.01); *H04L 2001/0097* (2013.01); *H04B 7/14* (2013.01)
USPC ................................ 370/315; 370/211; 455/7

(58) Field of Classification Search
CPC ........ H04B 7/2606; H04B 7/14; H04W 88/04
USPC .................. 370/315; 375/211–215; 455/7–25
See application file for complete search history.

(56) References Cited

U.S. PATENT DOCUMENTS

| | | | |
|---|---|---|---|
| 5,455,569 A * | 10/1995 | Sherman et al. | 370/228 |
| 5,787,080 A * | 7/1998 | Hulyalkar et al. | 370/310.2 |
| 5,974,236 A * | 10/1999 | Sherman | 709/221 |
| 6,392,661 B1 | 5/2002 | Tankersley | |
| 6,522,325 B1 | 2/2003 | Sorokin et al. | |
| 6,535,226 B1 | 3/2003 | Sorokin et al. | |
| 6,744,396 B2 | 6/2004 | Stone et al. | |
| 6,778,906 B1 | 8/2004 | Hennings et al. | |
| 6,952,001 B2 | 10/2005 | McKendree et al. | |
| 6,952,181 B2 | 10/2005 | Karr et al. | |
| 7,027,055 B2 | 4/2006 | Anderson et al. | |
| 7,034,678 B2 | 4/2006 | Burkley et al. | |
| 7,043,344 B2 | 5/2006 | Kotzev et al. | |
| 7,081,834 B2 | 7/2006 | Ruokangas et al. | |
| 7,085,683 B2 | 8/2006 | Anderson et al. | |

(Continued)

OTHER PUBLICATIONS

Colagrosso, "Intelligent broadcasting in mobile ad hoc networks: Three classes of adaptive protocols," [online], Website: Mike Colagrosso, 2006, [retrieved on Sep. 9, 2008], Retrieved via the internet: <http://ore.mines.edu/~mcolagro/publications/Colagrosso06a>, 25 pages.

(Continued)

*Primary Examiner* — Mark Rinehart
*Assistant Examiner* — Mang Yeung
(74) *Attorney, Agent, or Firm* — Sunstein Kann Murphy & Timbers LLP

(57) ABSTRACT

Distributing a message in a network may include transmitting, via a contention-free access channel, the message from an originating node to a first set of nodes neighboring the originating node, and designating a subset of the first set of nodes as relay nodes. A first one of the relay nodes may then relay, via the contention-free access channel, the message to a second set of nodes neighboring the first relay node.

22 Claims, 6 Drawing Sheets

(56) References Cited

U.S. PATENT DOCUMENTS

| | | | |
|---|---|---|---|
| 7,091,852 | B2 | 8/2006 | Mason et al. |
| 7,205,933 | B1 | 4/2007 | Snodgrass |
| 7,219,149 | B2 * | 5/2007 | Ofir et al. ............... 709/224 |
| 7,250,944 | B2 | 7/2007 | Anderson et al. |
| 7,257,563 | B2 | 8/2007 | Shmulevich et al. |
| 7,593,376 | B2 * | 9/2009 | D'Amico et al. ........... 370/338 |
| 7,643,426 | B1 * | 1/2010 | Lee et al. ............... 370/238 |
| 2002/0009998 | A1 | 1/2002 | Reemtsma |
| 2002/0010734 | A1 | 1/2002 | Ebersole et al. |
| 2002/0097732 | A1 * | 7/2002 | Worster et al. ........... 370/408 |
| 2003/0037033 | A1 | 2/2003 | Nyman et al. |
| 2003/0083062 | A1 * | 5/2003 | Bartolome et al. ......... 455/426 |
| 2003/0100343 | A1 | 5/2003 | Zourntos et al. |
| 2003/0137444 | A1 | 7/2003 | Stone et al. |
| 2003/0142645 | A1 | 7/2003 | Belcea |
| 2004/0070515 | A1 | 4/2004 | Burkley et al. |
| 2004/0114521 | A1 | 6/2004 | Sugaya |
| 2004/0136378 | A1 | 7/2004 | Barrett et al. |
| 2004/0183695 | A1 | 9/2004 | Ruokangas et al. |
| 2004/0233097 | A1 | 11/2004 | McKendree et al. |
| 2005/0001720 | A1 | 1/2005 | Mason et al. |
| 2005/0060339 | A1 | 3/2005 | McGee |
| 2005/0111383 | A1 | 5/2005 | Grob et al. |
| 2006/0140135 | A1 | 6/2006 | Bonta et al. |
| 2006/0146730 | A1 | 7/2006 | Zeng et al. |
| 2006/0176169 | A1 | 8/2006 | Doolin et al. |
| 2006/0268792 | A1 | 11/2006 | Belcea |
| 2006/0271663 | A1 * | 11/2006 | Barillari et al. ........... 709/223 |
| 2006/0279630 | A1 | 12/2006 | Aggarwal et al. |
| 2007/0008947 | A1 | 1/2007 | Belcea |
| 2007/0050169 | A1 | 3/2007 | Jha et al. |
| 2007/0060045 | A1 | 3/2007 | Prautzsch |
| 2007/0088750 | A1 | 4/2007 | Dumas et al. |
| 2007/0117576 | A1 | 5/2007 | Huston |
| 2007/0127421 | A1 * | 6/2007 | D'Amico et al. ........... 370/338 |
| 2007/0140145 | A1 | 6/2007 | Kumar et al. |
| 2007/0201382 | A1 | 8/2007 | Ekl et al. |
| 2007/0204021 | A1 | 8/2007 | Ekl et al. |
| 2007/0223930 | A1 | 9/2007 | Ternullo et al. |
| 2009/0061892 | A1 * | 3/2009 | Lee et al. ............... 455/456.1 |
| 2009/0252065 | A1 * | 10/2009 | Zhang et al. ............. 370/256 |
| 2009/0310692 | A1 * | 12/2009 | Kafle et al. ............. 375/260 |

OTHER PUBLICATIONS

Colagrosso, "Intelligent broadcasting in mobile ad hoc networks: Three classes of adaptive protocols," EURASIP Journal on Wireless Communications and Networking, vol. 2007, Article ID 10216, 2007, 16 pages.

* cited by examiner

NETWORK COMMUNICATION SYSTEMS AND METHODS

TECHNICAL FIELD

The present invention relates, in various embodiments, to the distribution of messages in a network, to the registration of a node in the network, and to the resynchronization of a node with the network.

BACKGROUND

Dismounted operations, such as combat operations, disaster relief operations, and peacekeeping operations, typically include members (e.g., soldiers of a company unit) who are unevenly distributed over a geographical area and may operate in an environment where an external communication infrastructure is broken or unavailable. These operations may, therefore, employ ad-hoc communication networks to disseminate information, such as control messages and situation-awareness messages, among the members of the unit. As new members join the operation, they may register to the network and start communicating with other members of the unit.

Typically, communication networks supporting the above-mentioned operations cater to many diverse requirements, such as consistency with other network protocols (e.g., TCP/IP or UDP), consistency with many security protocols (e.g., HAIPE), or the ability to handle video communications or large file transfers. As a result, devices encompassing these diverse functionalities are typically impractical in size (e.g., too large to be easily carried by every member of the unit, for example in a pocket) and/or too expensive to be provided to every member of the unit.

In some cases, such devices fail to perform any particular function well and leave the members of the unit without communication support. For example, in some instances, the networks employ channel access mechanisms where more than one node tries to communicate over the same channel (e.g., using the same frequency) at the same time. Consequently, data-collisions occur, which often results in multiple re-transmissions and unnecessary bandwidth consumption.

In addition, in many operations, members of the unit are unevenly dispersed in an area such that each member is unable to directly communicate with every other member. In such a case, one way to deliver a message to all members of the unit is for every member to re-transmit a received message to all other members that are in the re-transmitting member's direct communication range. This approach results, however, in an unreasonable bandwidth consumption, with too many nodes receiving multiple copies of the same message.

There exists a need, therefore, for a new communication protocol for ad-hoc networks.

SUMMARY OF THE INVENTION

Described herein are systems and methods for distributing messages in a network (such as an ad-hoc network), for registering a node to the network, and for resynchronizing a node with the network. This distribution, registration, and resynchronization may occur via a contention-free access channel. In addition, a relay mechanism may be employed to ensure that all transmitted messages are received by all network nodes in a bandwidth-efficient manner.

Certain embodiments of the invention enable peer-level communications among nodes, such as pocket-sized devices. The communications may include control or situation-awareness messages, and may be distributed among nodes that are unevenly dispersed in an area of operation. In one embodiment, these pocket-sized devices provide an inexpensive solution that facilitates the communication of messages amongst users of the nodes (e.g., soldiers) in a variety of environments, such as in an open field, in a forest, or in uneven terrain.

In one embodiment, all nodes in the network use a contention-free access channel, such as a time division multiple access (TDMA) channel, to transmit and receive messages (e.g., encrypted messages). In one embodiment, this ensures that all nodes are able to communicate in a bandwidth efficient manner, for example without data-collisions and without re-transmissions.

In addition, channel bandwidth may be efficiently consumed by employing relaying methods. For example, "neighbor knowledge" may be employed to ensure that nodes which are geographically distant from a transmitting node, and which are unable to directly receive transmissions from the transmitting node, receive such transmissions indirectly in a bandwidth efficient manner. More specifically, in one embodiment, neighbor knowledge is used to select certain nodes in a first set of nodes as relay nodes, and only the relay nodes are directed to re-transmit the message received from the transmitting node to the distant nodes. This relaying approach typically eliminates the unnecessary use of channel bandwidth, which may be a scarce resource in the operation. The delivery of messages in the network may also be assured by acknowledging, at least once, the receipt of messages and retransmitting messages if the acknowledgements are not received at the transmitting node within a specified period of time.

In general, in one aspect, embodiments of the invention feature a method of distributing messages in a first network. The method includes transmitting, via a contention-free access channel, a message from an originating node to a first set of nodes neighboring the originating node, designating a subset of the first set of nodes as relay nodes, and relaying, via the contention-free access channel, the message by a first one of the relay nodes to a second set of nodes neighboring the first relay node.

In general, in another aspect, embodiments of the invention feature a network for distributing messages. The network includes a first set of nodes, in which a subset thereof are designated as relay nodes, as well as an originating node for transmitting, via a contention-free access channel, a message to the first set of nodes. The first set of nodes neighbor the originating node and a first one of the relay nodes is for relaying, via the contention-free access channel, the message to a second set of nodes neighboring the first relay node. The second set of nodes may also be part of the network.

In various embodiments, the network is managed with a master node or, if and when the master node fails to communicate with other nodes in the network, with a deputy node. The network may be, for example, a mobile ad hoc network or a broadcast local area network. The network may include a gateway node for communicating with a second network. In some embodiments, a node in the first set of nodes is removed from the network.

In various embodiments, a node in the first set of nodes transmits an acknowledgement of the message for the originating node. For its part, the originating node may retransmit the message to the first set of nodes if an acknowledgement from each node in the first set of nodes is not received at the originating node. In addition, the originating node may retransmit the message to the first set of nodes if the relayed message, or if an acknowledgement from each of the relay nodes, is not received at the originating node. The message may be, for example, a node location message, a node status message, a network status message, and/or an operation change message. In addition, the message may be encrypted.

For its part, the contention-free access channel may be, for example, a time-division multiple-access channel, a frequency-division multiple-access channel, a spatial-division multiple-access channel, or an orthogonal frequency-division multiple-access channel.

In general, in yet another aspect, embodiments of the invention feature a method of registering a node in a network, such as, for example, a mobile ad hoc network or a broadcast local area network. The method includes transmitting a registration request, using a designated slot in a contention-free access channel, from a registering node to a master node within the network, and receiving at the registering node a temporary node-identifier and an identification of a temporary slot in the contention-free access channel. The method also includes transmitting information from the registering node to the master node, using the temporary node-identifier and the temporary slot, to identify the registering node to the master node.

In general, in still another aspect, embodiments of the invention feature a system for registering a node in a network, such as, for example, a mobile ad hoc network or a broadcast local area network. The system includes a master node and a registering node. The registering node may transmit, using a designated slot in a contention-free access channel, a registration request to the master node, and may receive therefrom a temporary node-identifier and an identification of a temporary slot in the contention-free access channel. The registering node may then transmit information to the master node, using the temporary node-identifier and temporary slot, to identify the registering node to the master node.

In various embodiments, if the temporary node-identifier and the temporary slot are not received at the registering node within a specified period of time, the registering node retransmits the registration request to the master node. In one embodiment, the registration request includes an initial node identifier identifying the registering node and the information transmitted from the registering node to the master node includes a first digital certificate. The master node may transmit to the registering node a first message acknowledging receipt of the first digital certificate and also a second digital certificate. The registering node may then transmit a second message to the master node acknowledging receipt of the second digital certificate. The first message may be encrypted using a first private key and the second message may be encrypted using a second private key.

Upon registration, the registering node may receive a permanent node-identifier and an identification of a permanent slot in the contention-free access channel. The registering node may then broadcast a pilot message identifying, to other nodes in the network, registration of the registering node to the network. The master node may receive the pilot message and re-assign the temporary node-identifier and the temporary slot to a second registering node.

In various embodiments, the master node receives a second registration request from a second registering node, and transmits a message to the second registering node informing the second registering node that the second registration request has been queued.

One or more of the registration request, the temporary node-identifier, an identification of the temporary slot, and the information transmitted from the registering node to the master node may be formatted in a mixed-crypto format. In addition, the contention-free access channel may be a time-division multiple-access channel, a frequency-division multiple-access channel, a spatial-division multiple-access channel, or an orthogonal frequency-division multiple-access channel.

In general, in a further aspect, embodiments of the invention feature a method for resynchronizing a node with a network, such as, for example, a mobile ad hoc network or a broadcast local area network. The method includes receiving at a resynchronizing node, via a contention-free access channel, a first message from a supplier node within the network. Thereafter, a resynchronization request that includes a reference to a point in time at which the resynchronizing node lost communication with the network is transmitted from the resynchronizing node to the supplier node. Based on that reference, a first missed message is then received at the resynchronizing node from the supplier node.

In one embodiment, the reference in the resynchronization request includes a first timestamp. The resynchronization request may also include a second timestamp having a time greater than (i.e., later than) a time of the first timestamp. In one embodiment, the first missed message received at the resynchronizing node includes a timestamp having a time between the times of the first and second timestamps.

In various embodiments, the method further includes determining that the resynchronizing node had received fewer messages than the supplier node at a time indicated by the first timestamp, transmitting from the resynchronizing node to the supplier node a second timestamp having a time less than (i.e., earlier than) the time indicated by the first timestamp, and receiving at the resynchronizing node from the supplier node a second missed message that includes a timestamp having a time between the times of the first and second timestamps. The method may also include transmitting from the resynchronizing node to the supplier node an acknowledgement for at least one of the first message, the first missed message, and the second missed message.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Described herein are systems and methods for distributing messages in a network using a contention-free access channel, systems and methods for registering a node to the network, and systems and methods for resynchronizing a node with the network. In general, in broad overview, the communication protocol employed to distribute the messages in the network (e.g., a mobile ad-hoc network) may be used to support dismounted small unit operations, such as combat operations, disaster relief operations, and/or peacekeeping operations. In one embodiment, an originating node, for example a mobile computing device, transmits a message, via the contention-free access channel (e.g., a TDMA channel), to a first set of nodes neighboring the originating node (i.e., a set of nodes capable of directly receiving messages from, and directly transmitting messages to, the originating node). A relay mechanism may then be implemented. More specifically, a subset of the first set of nodes may be designated as relay nodes and the message relayed from each one of the relay nodes to a second set of nodes neighboring the relay node in question. Again, the relaying of the message may occur via the contention-free access channel. In such a fashion, and as further described below, messages may be distributed in the network in a bandwidth efficient, and contention-free, manner.

Figure 1:
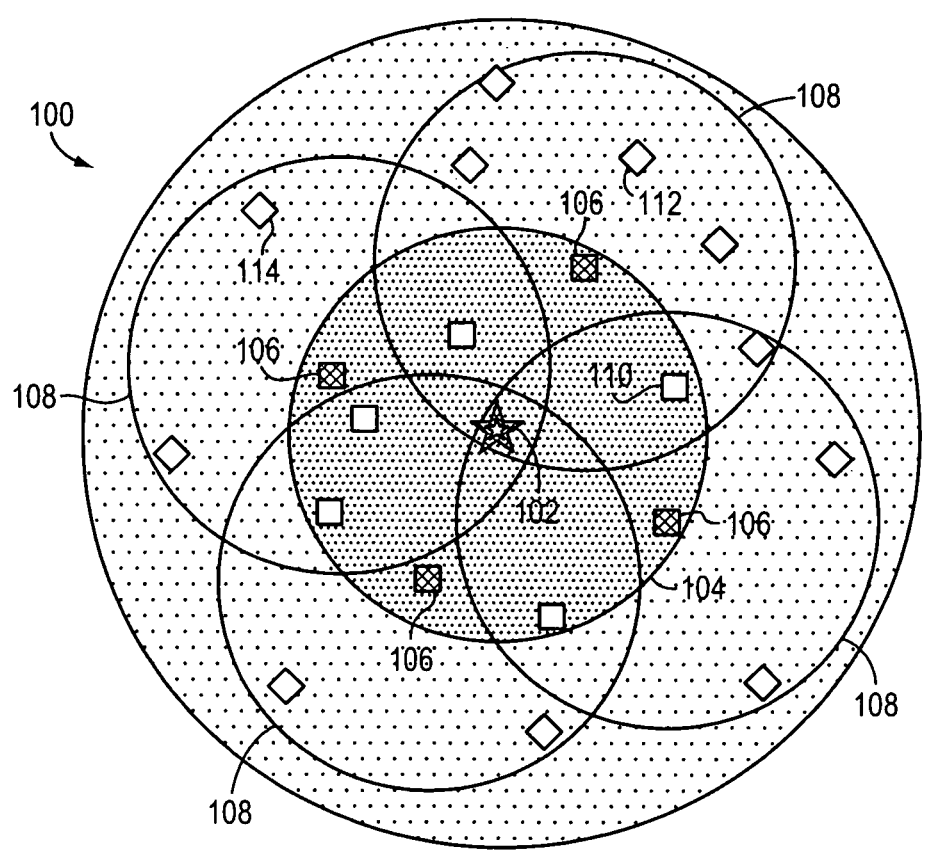
FIG. 1 is a diagram of an illustrative embodiment of a network for distributing messages in accordance with the invention.

FIG. 1 depicts a network 100 for distributing messages according to an illustrative embodiment of the invention. The network 100 may include an originating node 102, a first set of nodes 104 (i.e., the set of nodes within the circle 104), and second sets of nodes 108. A subset of nodes (e.g., the nodes 106) in the first set of nodes 104 may be designated as relay nodes. In addition, the network 100 may optionally include a master node 110, a deputy node 112, and a gateway node 114. The network 100 may be the only network in the message distribution operation or there may be several networks connected to each other through one or more gateway nodes 114.

The network 100 may be, for example, a wired or wireless broadcast local-area network (LAN), mobile ad-hoc network (MANET), such as a network formed by an operational team to support dismounted small unit operations, metropolitan area network (MAN), or wide area network (WAN), such as a military network spread over various distant locations. In one embodiment, the network 100 is a mobile ad-hoc network having an operational area of less than a few square miles and a limited number of nodes, for example less than 250 nodes. As described herein, the network 100 may be used to reliably distribute messages in combat operations, disaster relief operations, peacekeeping operations, and/or any other type of operation. The network 100 may be formed, for example, in a variety of environments where the external communication infrastructure is broken or unavailable, such as in an open field, in a forest, or in uneven terrain and urban settings.

The various nodes within the network 100 may be connected to the each other through any of a variety of wireless or wired contention-free access channels, which may be established using a variety of communication protocols. In one embodiment, for example, the nodes within the network 100 transmit and receive messages on a common radio channel where access to the channel is managed via a contention-free communication protocol, such as a TDMA protocol, a frequency division multiple access (FDMA) protocol, a spatial-division multiple-access protocol, an orthogonal frequency-division multiple-access protocol, or any other contention-free communication protocol. TDMA, for example, may provide contention-free channel access by dividing a major time cycle (e.g., one second) into equal time slots and assigning each node in the network 100 at least one unique time slot during which it can transmit messages. The start of the major time cycle may be synchronized by using time derived from a geographical positioning system (such as GPS) and no other clock synchronizations may be needed. Accordingly, in one embodiment, access to the channel does not require contention resolution, and all nodes within the network 100 are able to communicate.

Each of the nodes within the network 100 may be any type of pocket-sized communication device, walkie-talkie, handheld device, navigation device, GPS device, personal computer, Windows-based terminal, network computer, information appliance, RISC Power PC, X-device, workstation, mini computer, main frame computer, personal digital assistant, set top box, or other computing device that is capable of both presenting information/data to, and receiving commands from, a user of the node. For example, each of the nodes within the network 100 may include a visual display (e.g., a touch screen, a small LCD screen, or a computer monitor), a data entry device (e.g., a keypad, a keyboard, and/or a mouse), persistent and/or volatile storage (e.g., computer memory), a processor, a transceiver (e.g., an antenna), an audio output device (e.g., a speaker), an audio input device (e.g., a microphone), and/or a camera (e.g., a still image camera or a video camera). In one embodiment, each of the nodes within the network 100 is capable of transmitting data/messages to, or receiving data/messages from, another node within the network 100 or another node within another network, for example through the gateway node 114.

In one embodiment, each node of the network 100 is tied to its user's real identity. In a combat operation, for example, each node of the network 100 may be operated by a soldier and there may be a need to authenticate the node as being under the control of the soldier, both for the purpose of registering the node to the network 100 and to lock out nodes that may have been compromised (e.g., obtained by an enemy combatant). Authentication may require that a digital certificate (e.g., X.509 certificate) issued to the soldier reside on the node. The certificate may bind the name of the soldier to a public key. Such a certificate may be digitally signed by a trusted authority whose public key is known in advance. In one embodiment, only the soldier knows a private key associated with his certificate. The soldier's private key may be encrypted, for example, with a symmetric algorithm using a passcode (e.g., password or passphrase) that the soldier may remember easily.

In one embodiment, when the soldier needs to authenticate who he is to another node, and that he is in proper control of his node, he unlocks the private key with his passcode so that the private key be used to digitally sign a message transmitted to that other node. The same passcode may be used to control access to the node. In one embodiment, a copy of the passcode is processed through a cryptographic hash function (e.g., SHA-2) and stored on the node. When the user types in the passcode, it too may be processed through the same hash function and the result may be compared to the stored copy of the passcode.

In one embodiment, the master node 110 is a node in the network 100 that is designated to setup and manage the network 100. In one embodiment, as described further below, the master node 110 controls the registration of other nodes to the network 100 and the allocation of slots in the contention-free access channel to those other nodes, and oversees the operation of the gateway node 114 and the remote zeroization of errant nodes. The master node 110 may be the first node in the network 100 at the time the network 100 is setup, and the rest of the nodes may be then registered with the help of the master node 110. The master node 110 may also be assigned a node identification number (ID) equal to 1 and the rest of nodes registered to the network 100 may be assigned a node ID greater than 1.

In one embodiment, as a part of the TDMA protocol, the master node 110 allocates time slots to the other nodes in the network 100. The master node 110 may assign multiple slots to each node, a single slot to each node, or multiple slots to some nodes and single slots to other nodes. In addition, the master node 110 may retain a designated slot for itself to support field registration of new nodes entering in the network 100. In one embodiment, if all the slots have been allocated, the master node 110 de-allocates one or more slots in order to register a new node into the network 100.

In one embodiment, the deputy node 112 is assigned the same responsibilities as the master node 110 and manages the network 100 if and when the master node 110 fails to communicate with the other nodes in the network 100 (e.g., if and when the master node 110 is compromised by an enemy combatant, or if and when the master node 110 goes out of range of every node of the network 100). The deputy node 112 may be the node in the network 100 with the lowest node ID higher than the node ID of the master node 110.

The gateway node 114 may facilitate communication between the nodes of the network 100 and the nodes of one or more other second networks (not shown). The gateway node 114 may have the capability of communicating with the other networks using one or more protocols. As described further below, the gateway node 114 may also facilitate the communication between two or more networks that are formed by the split of the original network 100. In one particular embodiment, the master node 110 is also assigned to act as the gateway node 114 in the network 100.

In one embodiment, as described, the network 100 is formed as a mobile ad-hoc network for combat operation where the nodes of the network 100 are operated by soldiers. The types messages transmitted by the nodes in such a network 100 may be, for example, one or more of: i) node location messages and node status messages that identify the location and status of each soldier in the unit, respectively; ii) messages that contain threat information reporting on the type, location, and seriousness of the threats in the combat field; iii) operation change messages that identify changes in the plan of action distributed by a unit commander; and iv) network status messages that contain network 100 status information informing each soldier of the health of the network 100 and if there are any connectivity problems in any part of the network 100. One or more of these messages may be distributed in the network 100 at periodic intervals. Using the TDMA protocol, for example, the originating node 102 may transmit a message including its and its neighboring nodes' location and status information every Nth major time cycle.

Where TDMA is used as the contention-free communication protocol, the maximum amount of information that may be transmitted in one time slot is determined from the channel bit rate and the duration of the time slot. Where the message transmitted by the originating node 102 is larger than that maximum, the message may be divided into smaller message "blocks." In one embodiment, the message blocks are independently distributed by the originating node 102 using different time slots, and are reassembled at the receiving nodes, for example at nodes within the first set of nodes 104, to recover the complete message. In another embodiment, more than one message block is transmitted by the originating node 102 in a single time slot. Each transmission may include several fields, such as, for example, pilot information, message distribution management information, and message data. These fields may be distinguished from one another by defining each field type and its length. In one embodiment, the pilot information is present in each transmission sent from the originating node 102, while the message distribution management information is optional. In another embodiment, the pilot information is not present in the relay transmissions from the relay nodes 106.

In greater detail, the pilot information field of a block transmitted by the originating node 102 may include: (i) framing bits, which may be used by the receiving node(s) in the first set of nodes 104 to synchronize to the message stream; (ii) the node ID of the originating node 102; (iii) status information bits, which may indicate the configuration of the node 102 and the health of the user of the node 102; (iv) geolocation bits, which may use latitude and longitude co-ordinates to identify the location of the originating node 102; and (v) transmission type bits, which may be used to indicate if the message contained in the block is encrypted and if any status and geolocation bits are present. The message distribution management information field of a block transmitted by the originating node 102 may include: (i) "Recently Heard Nodes" bits, which may indicate those nodes in the network 100 from which the originating node 102 has previously received a transmission; (ii) "Relay for Broadcast" bits, which may indicate the node IDs of the nodes in the first set of nodes 104 that should retransmit the message block (i.e., which indicate the node IDs of the relay nodes 106); (iii) "Recently Relayed Blocks" bits and "Recently Heard Blocks" bits, which may be used to acknowledge the receipt of other relay directives and message blocks, respectively; and (iv) "Relay Toward Specified Gateway" bits, which may serve to indicate the node ID of one of the relay nodes 106 and the node ID of the gateway node 114 if the message block is to be transmitted to the gateway node 114. The message data field of a block transmitted by the originating node 102 may include: (i) a block tag to indicate if the message is a single block message, if the instant block is the last block in the message, or any other block positioning information; (ii) a block length to specify the length of the data excluding the header information; (iii) a node ID indicating that the message originated from a node other than the originating node 102 (i.e., indicating that the originating node 102 is relaying a previously transmitted message); (iv) a block number that provides a serial number for the block in a multiple block message; and (v) message data to be transmitted in the network 100.

In one embodiment, a message distributed in the network 100 is encrypted with a common network key using a 128-bit advanced encryption standard (AES) cipher in counter mode (CTR). Counter mode provides a keystream that is exclusive-ORed with the plain-text of the message to produce the cipher-text. In one embodiment, the keystream for the network 100 is generated from a network key, a randomly generated initialization vector (a nonce), and an epoch time, all of which are assigned to every node in the network 100 at the time of entry of the node into the network 100 (e.g., at the time of registration of the node in the network 100). A block of the keystream may be generated by encrypting a "counter block"—a 48-bit counter value appended to the 80-bit initialization vector—with the network key. In TDMA for example, the counter value may be the concatenation of a 36-bit time slot count with 12-bits that indicate the sequence number of the encrypted block within that slot. In one embodiment, all of the nodes are synchronized to the GPS time base and every node can easily determine the slot count for a given transmission. The keystream generated in this way may have a repetition cycle of approximately 8.7 years.

It will be understood by those skilled in the art that FIG. 1 is a simplified illustration of the network 100 and that it is depicted as such to facilitate the explanation of the present invention. For example, more than one originating node 102, more than one first set of nodes 104, more than one set of relay nodes 106, fewer or more than the four depicted second sets of nodes 108, more than one deputy node 112 and more than one gateway node 114 may be present in the network 100. In addition, the set of relay nodes 106 may be all nodes included within the first set of nodes 104. The number of nodes in the first set of nodes 104 and in the second sets of nodes 108 may not be fixed and may change over time. The master node 110 and the gateway node 114 may be the same node. In addition, the network 100 may not include one or more of the master node 110, the deputy node 112, or the gateway node 114. A "reliable" communication protocol may be used for message distribution in the network 100. The communication boundaries of the first set of the nodes 104 and the second sets of nodes 108 may not be circular and may be of any other uniform, non-uniform, or arbitrary shape.

Moreover, in accordance with embodiments of the invention, a subset of nodes in the set of relay nodes 106 may be designated as the relay nodes for more than one originating node 102. In addition, a subset of nodes in a second set of nodes 108 may be designated as a second set of relay nodes and a third set of nodes may be defined as neighboring that second set of nodes 108. The second set of relay nodes may receive the message transmitted by one of the relay nodes 106 and further transmit the message to the third set of nodes. This transmission process may be extended through a third, a fourth, a fifth, or any number of sets of relay nodes and a corresponding fourth, fifth, sixth, or any number of sets of neighboring nodes. As such, the depiction of the network 100 in FIG. 1 is non-limiting.

Figure 2:
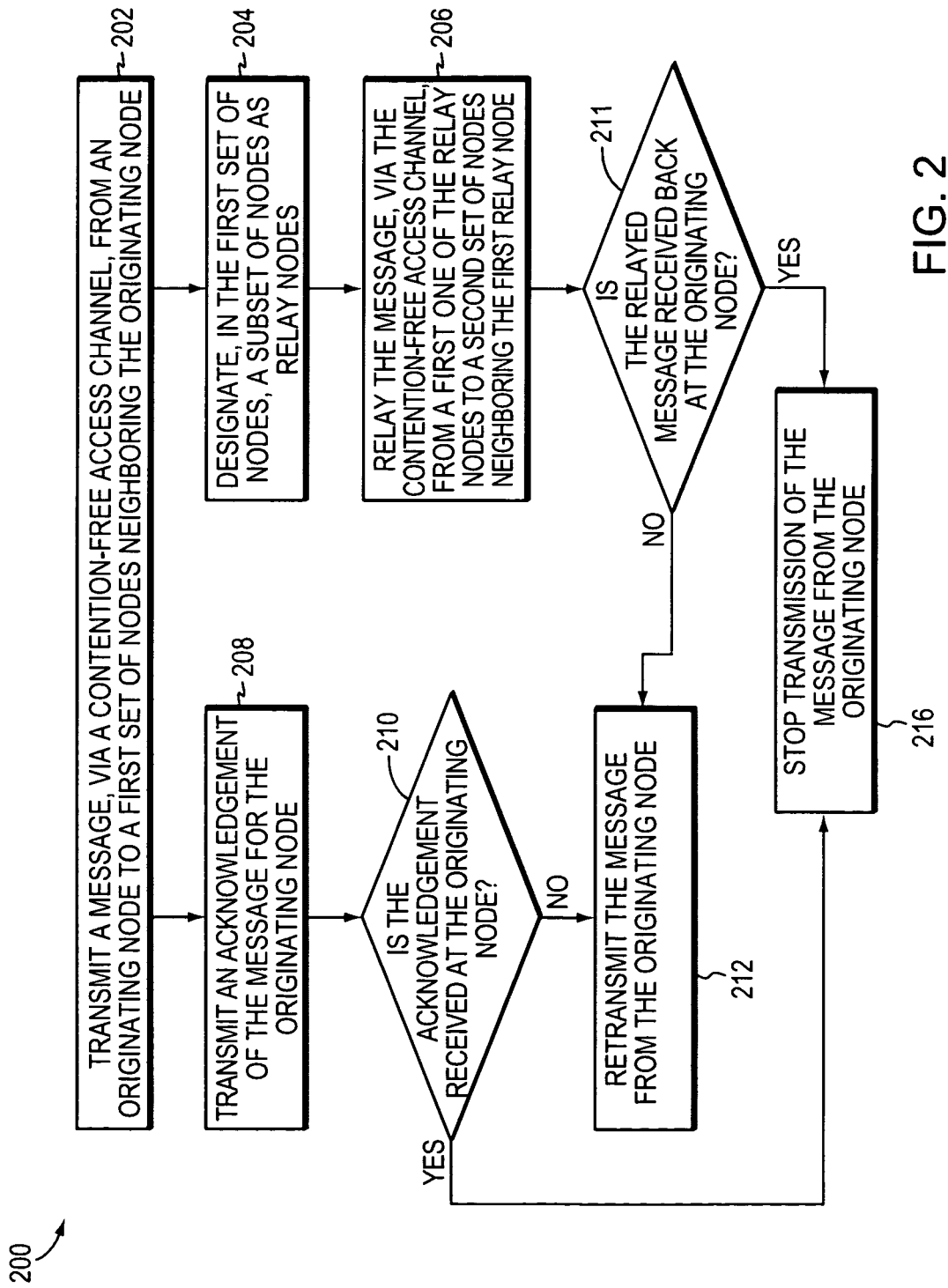
FIG. 2 is a flow diagram of an illustrative embodiment of a method for distributing messages in a network in accordance with the invention.

With reference now to FIG. 2, in one embodiment of a method 200 for distributing messages in a network, for example in the network 100 depicted in FIG. 1, a message is transmitted, via the contention-free access channel, from the originating node 102 to the first set of nodes 104 neighboring the originating node 102 (step 202), a subset of the first set of nodes 104 are designated as the relay nodes 106 (step 204), and the message is relayed, via the contention-free access channel, from each of the relay nodes 106 to a second set of nodes 108 neighboring that relay node 106 (step 206). Optionally, the method 200 may also include transmitting an acknowledgement of the message from a node in the first set of nodes 104 for the originating node 102 (step 208). The method 200 may also optionally include determining if the relayed message transmitted from the set of relay nodes 106 is received back at the originating node 102 (step 211). If either the acknowledgement or the relayed message is not received at the originating node 102 (i.e., a "NO" answer is provided either at step 210 or at step 211, respectively), the message may be retransmitted from the originating node 102 to the first set of nodes 104 (step 212). Eventually, an answer "YES" is provided to the query at step 210 and at step 211, and the transmission of the message from the originating node 102 is stopped (step 216).

In greater detail, and with reference to FIGS. 1 and 2, at step 202 the originating node 102 transmits a message, via the contention-free access channel, to the first set of nodes 104 that neighbor the originating node 102. In one embodiment, the originating node 102 transmits a message to provide an update on the status of the network 100 (e.g., to inform the nodes in the network 100 of the addition or deletion of nodes in the network 100). For example, the originating node 102 may stop receiving transmissions from one of the nodes in the first set of nodes 104 from which it previously received one or more messages and thereby determine that that node is no longer a member of the first set of nodes 104. In such a case, and using the TDMA protocol as an example, the originating node 102 may wait for its time slot and then transmit a network status message to the first set nodes 104 to report its most updated list of nodes constituting the first set of nodes 104. The originating node 102 may use the "Recently Heard Nodes" bits in the message distribution management information field of the message to report the list of members in the first set of nodes 104. In one embodiment, the originating node 102 transmits such network status messages at specified periodic time intervals. In another embodiment, such periodic network status messages are transmitted to a particular node, for example to the gateway node 114, for retransmission in the network 100. In one embodiment, the originating node 102 transmits each network status message a predetermined number of times (i.e., more than once) to ensure that all of the nodes in the first set of nodes 104 receive the message. As another example, the originating node 102 (e.g., a unit commander in a combat operation) transmits a message, for example during its assigned time slot in the TDMA protocol, to inform the first set of the nodes 104 (e.g., soldiers under his command) of changes in the plan of action.

The message transmitted from the originating node 102 to the first set of nodes 104 may include, for example, text, audio, images, and/or video. In addition, the message may be outputted at each of the nodes in the first set of nodes 104 visually on a screen or audibly through speakers. In one embodiment, the network 100 depicted in FIG. 1 primarily operates in an omnidirectional broadcast mode such that the message transmitted by the originating node 102 is received by all the nodes in the first set of nodes 104. In another embodiment, the message transmitted by the originating node 102 is meant to be received by a specific node, for example the gateway node 114. In such a case, the network 100 is said to operate in a "directed" broadcast mode, as opposed to the omnidirectional broadcast mode. As further described below, in the directed broadcast mode the message transmitted by the originating node 102 may include information about the nodes, in the first set of nodes 104 and the second set of nodes 108, that previously received a message from that specific node 114.

As previously described, the nodes in the network 100 may be dispersed geographically such that not every node receives directly the message transmitted by the originating node 102. For example, in a combat operation, a message containing changes in the plan of action transmitted by the originating node 102 (e.g., a unit commander) may not be heard by some of the nodes in the second sets of nodes 108 (e.g., those nodes in the circles 108 that are outside of the circle 104). Accordingly, at step 204, a relay mechanism may be implemented. More specifically, a subset of nodes in the first set of nodes 104 may be designated as relay nodes 106. Then, at step 206, the message received from the originating node 102 may be relayed, via the contention-free access channel, from each relay node 106 to the second set of nodes 108 that neighbor that relay node 106.

In one embodiment, a "flooding" mechanism is employed in which each node in the first set of nodes 104 is designated as a relay node 106 and re-transmits the message to its second set of nodes 108. Such a mechanism may, however, result in unmanageable consumption of the channel bandwidth in the network 100. Accordingly, in another embodiment, a subset of nodes having fewer than all of the nodes in the first set of nodes 104 is designated as the relay nodes 106 in a manner such that those relay nodes 106 are able to collectively relay the message to all of the nodes in the second sets of nodes 108. In one embodiment, a "greedy" algorithm is used to select the relay nodes 106 in the first set of nodes 104. As an example, the greedy algorithm may start by identifying a relay node 106 in the first set of nodes 104 which neighbors (and, therefore, can relay to) the most number of nodes in the second set of nodes 108. This algorithm step may be repeated for the remaining nodes in the second set of nodes 108 until all those nodes are covered by at least one relay node 106. In another embodiment, to direct a message towards a specific node (i.e., to operate in the directed broadcast mode), a subset of nodes in the first set of nodes 104 that previously received a message from that specific node are designated as the relay nodes 106.

At step 206, the relay nodes 106 may check the "Relay for Broadcast" bits in the message distribution management information field of the message to determine whether a directive from the originating node 102 to relay the message is present. If so, the relay nodes 106 may wait for their assigned slots, for example time slots in the TDMA protocol, to relay the message via the contention-free (e.g., TDMA) channel to the second sets of nodes 108. The message may be relayed from the relay nodes 106 in the same form (e.g., text, audio, image, and/or video) in which it was received from the originating node 102. Alternatively, the message may first be converted to another form and then relayed to the second sets of nodes 108. As before for the first set of nodes 104, the message may be outputted at each node in the second sets of nodes 108 visually on a screen or audibly through speakers.

In one embodiment of the invention, it is desirable to ensure that the message transmitted by the originating node 102 is received and relayed by each designated relay node 106. As illustrated in FIG. 1, the originating node 102 is part of each second set of nodes 108 neighboring a given relay node 106 (i.e., is within the circle 108 surrounding each relay node 106). Accordingly, when a relay node 106 relays a message to its second set of nodes 108, that relayed message should be received at the originating node 102 (i.e., a "YES" answer should be provided at step 211 and the transmission of the message from the originating node 102 should be stopped at step 216). If, however, the relayed message is not received at the originating node 102 (i.e., a "NO" answer is provided at step 211), the originating node 102 may retransmit (at step 212) the message with, again, the appropriate relay directive to the relay nodes 106.

In one embodiment, the originating node 102 keeps track of the relay nodes 106 from which it has not received the relay message and retransmits the message with the appropriate relay directive only to those relay nodes 106. In yet another embodiment, if the originating node 102 does not receive the relay message from a given relay node 106 after one or more retransmissions thereto, the originating node 102 concludes that that relay node 106 is no longer active (e.g., it may have left the first set of nodes 104 or it may have been compromised). In such a case, the originating node 102 may designate a new subset of nodes in the first set of nodes 104 as relay nodes 106.

In one embodiment, a message received at the originating node 102 from the relay node 106 includes, in the "Recently Relayed Blocks" bits of the message distribution management information field of the relayed message, the node ID of the originating node 102, which indicates that the relay node 106 has completed the relay directive sent by the originating node 102.

In another embodiment of the invention, it is desirable to ensure that the message transmitted by the originating node 102 is received by every node in the first set of nodes 104. Accordingly, at step 208, each node in the first set of nodes 104 may be required to transmit, for the originating node 102, an acknowledgement of the receipt of the originating node's message. In one particular embodiment, the network 100 is stationary such that the nodes in the first set of nodes 104 are constant. In such a case, each node in the first set of nodes 104 may transmit an acknowledgement only once.

In another embodiment, the network 100 is a mobile ad-hoc network such that the nodes in the first set of nodes 104 are constantly changing. For example, a node in the second set of nodes 108 may enter into the geographical area of the first set of nodes 104 just after receiving (via a relay node 106) and acknowledging a message transmitted by the originating node 102. In such a case, the originating node 102 may not receive the acknowledgement before it recognizes the newly-entering node as a member of the first set of nodes 104, and, therefore, may not be able to confirm if the newly-entering node has already received the message. As such, upon recognizing the newly-entering node as a member of the first set of nodes 104, the originating node 102 may attempt to re-transmit the message thereto, which would be an unnecessary consumption of channel bandwidth. To deal with such a situation, each node in the first set of nodes 104 may be configured to transmit to the originating node 102 multiple acknowledgements of the receipt of the message. In such a fashion, while the first acknowledgement of the message may be sent by the newly-entering node before it is recognized by the originating node 102, second and/or subsequent acknowledgements may be sent by the newly-entering node after it is recognized by the originating node 102. The originating node 102 will know, therefore, that the message was received by the newly-entering node and not unnecessarily re-transmit the message thereto.

In one embodiment, upon the receipt of the message from the originating node 102, each node in the first set of nodes 104 periodically transmits an acknowledgement for the originating node 102 (until a predetermined maximum number of acknowledgments are sent) and keeps track of the number of times the acknowledgement is sent. If, for any reason, a node in the first set of nodes 104 again receives the same message from the originating node 102 before the maximum number of acknowledgments are sent, a counter may be reset and the transmission of the acknowledgements recommenced.

The acknowledgement from the nodes in the first set of nodes 104 may include, in the "Recently Heard Blocks" bits of the message distribution management information field of the acknowledgement, the node ID of the originating node 102 and the block number of the message. Again, the acknowledgement may be sent by each node in the first set of nodes 104 in its respective slot in the contention-free access channel, for example in its respective time slot when the TDMA protocol is used. The acknowledgment may be in the form of text, audio, images, and/or video, and may be outputted at the originating node 102 visually on a screen or audibly through speakers.

In one embodiment, if the originating node 102 receives an acknowledgment from each node in the first set of nodes 104, including the relay nodes 106 (i.e., a "YES" answer is provided at step 210), then the transmission of the message from the originating node 102 is stopped at step 216. If, however, the originating node 102 does not receive all acknowledgements (i.e., a "NO" answer is provided at step 210), then the originating node 102 may retransmit, at step 212, the message to the first set of nodes 104. In one embodiment, the originating node 102 keeps track of the nodes in the first set of nodes 104 from which it has not received the acknowledgement and retransmits the message to those nodes.

If the originating node 102 does not receive the acknowledgement after one or more retransmissions, the originating node 102 concludes that the nodes in the first set of nodes 104 from which no acknowledgements are received are no longer members of the first set of nodes 104 (e.g., they may have left the first set of nodes 104 or they may have been compromised). Accordingly, the originating node 102 may update a list of members of first set of nodes 104 and may transmit the updated list as a new message to the first set of nodes 104.

While the method 200 has been described from the point of view of the originating node 102, one of skill in the art will understand that the method 200 may also be performed from the point of view of a relay node 106 in relaying the message to a second set of nodes 108.

In one particular embodiment of the invention, a copy of all transmitted messages in the network 100 are saved in the receiving nodes, for example in a memory device. The saved messages may be ordered in the memory using, for example, a parameter that is a combination of the time at which the message was sent, the block number, and the node ID of the node from which the message was transmitted.

Zeroization of a Node

In one embodiment, a node (for example a node in the first set of nodes 104) is removed from the network 100. For example, in a combat operation a soldier operating a node in the first set of nodes 104 may fall under the threat of compromise by the enemy, or may totally loose control over the node. This may include situations where contact is lost between the node and the originating node 102 for a protracted period of time, and then the node reappears in the first set of nodes 104 under suspicious circumstances. In such cases, the node may be removed from the network 100 and prohibited from transmitting or receiving messages. This process may be termed as "zeroization," and may include both soft zeroization and hard zeroization.

Soft zeroization may prevent the enemy, who has captured a node, from eavesdropping on the network 100 or from extracting operational data saved in the memory of the captured node. Soft zeroization may involve, for example, erasing data from memory in the node. Data to be erased may include the network password, any unencrypted copy of the user's password, all operational messages, and all network management messages. A node that has been soft zeroized may be re-registered on the network 100 by a soldier who knows the user password. Hard zeroization may also remove from the captured node all copies of any digital certificate, any password, and disable the RF circuitry of the node. This may render the node totally unusable by anyone until, for example, a valid digital certificate and password are loaded into the node from an appropriate keymat server and the node's RF circuits are reset. Hard zeroization may be employed to prevent the scenario where an enemy coerces the user into entering a passcode that unlocks the node.

Zeroization may be effected either locally or remotely. The conditions for initiating zeroization may depend on the nature of the operation and the condition, or perceived condition, of the node and its assigned operator. In the case of local zeroization, the zeroization mechanism may be configured to be initiated quickly by the soldier, but may involve appropriate safeguards such that the zeroization doesn't happen accidentally during an operation. In the case of remote zeroization, consensus among multiple uncompromised network nodes, such as the originating node 102 and the first set of nodes 104, may be required in order to initiate zeroization of another node.

Network Registration

In general, in another aspect, various embodiments of the invention feature systems and methods of registering a node to the network 100. In general, in broad overview, the registering node may be tied to a user (e.g., a soldier) trying to register to the network 100. The network 100 may be used to support dismounted small unit operations, such as combat operations, disaster relief operations, and/or peacekeeping operations. In one embodiment, a registering node transmits a registration request, using a designated slot in a contention-free access channel (e.g., a TDMA channel), to a master node within the network 100. The registering node may then receive a temporary node-identifier and a temporary slot in the contention-free access channel. Using the temporary node-identifier and the temporary slot, the registering node may transmit information to the master node to identify the registering node to the master node. Upon registration, the registering node may receive a permanent node-identifier and a permanent slot in the contention-free access channel and may broadcast a pilot message informing other nodes in the network 100 of the registration of the registering node to the network 100. In such a fashion, and as further described below, the registering node may securely register to the network 100 without any prior knowledge of a network key.

Figure 3:
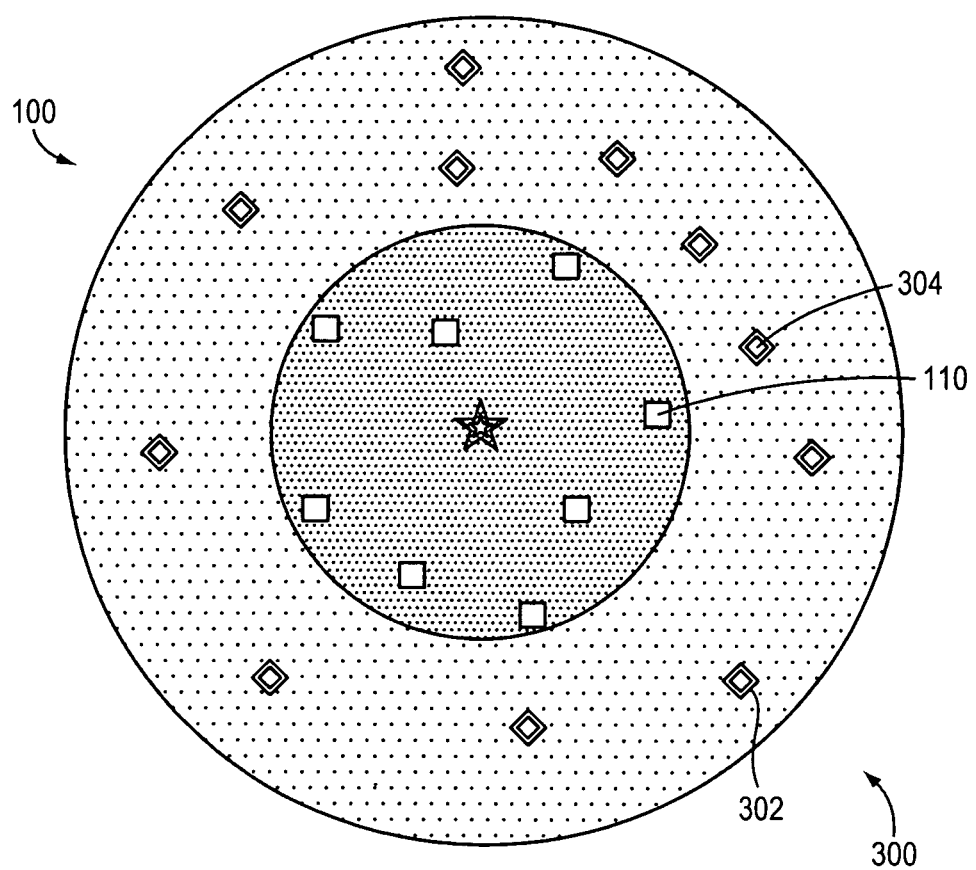
FIG. 3 is a diagram of an illustrative embodiment of a system for registering a node in a network in accordance with the invention.

FIG. 3 depicts a system 300 for registering a node to the network 100 in accordance with an illustrative embodiment of the invention. As illustrated, the system 300 may include the master node 110 and a first registering node 302. A second registering node 304, or any number of further registering nodes, may also be present in the system 300 and network 100.

As previously described, the various nodes in the network 100 may communicate with one another through a variety of wireless contention-free access channels, which may be established using a variety of communication protocols. In one embodiment, the master node 110 and the first and second registering nodes 302, 304 transmit and receive messages on a common radio channel, where access to the channel is managed via a contention-free communication protocol, such as a TDMA protocol, an FDMA protocol, a spatial-division multiple-access protocol, an orthogonal frequency-division multiple access protocol, or any other contention-free communication protocol. In one embodiment, the first and second registering nodes 302, 304 are capable of transmitting messages to, and/or receiving messages from, the master node 110 before registration to the network 100. Upon registration, the first and second registering nodes 302, 304 may transmit messages to, and/or receive messages from, any node within the network 100.

In one embodiment, before registration of the registering node 302 to the network 100, the registering node 302 does not have a network key permitting the transmission and/or reception of messages in the network 100. Rather, in one embodiment, a mixed-crypto format is used to transmit registration messages from the registering node 302 to the master node 110. The mixed-crypto format may also be used to transmit, from the master node 110 to the registering node 302, responses to the registration messages. In one embodiment, the exchange of mixed-crypto messages between the registering node 302 and the master node 110 is completed without the network key. The second registering node 304 and the master node 110 may also use the mixed-crypto format to exchange registration messages.

The mixed-crypto messages may include only unencrypted parts, or both unencrypted parts and encrypted parts. For example, in one embodiment, the registering node 302 creates and transmits to the master node 110 mixed-crypto messages having only unencrypted parts, while the master node 110 creates and transmits to the registering node 302 mixed-crypto messages having both unencrypted and encrypted parts. In one embodiment, the mixed-crypto messages are relayed to the registering node 302 from the master node 110 through one or more other nodes in the network 100. The encrypted part of the mixed-crypto messages may be used to direct such relaying. Upon receiving messages from the master node 110, the registering node 302 may parse and interpret the unencrypted parts of those messages, and ignore the encrypted parts of the messages. As described further below, several registration messages and other information exchanged between the registering node 302 and the master node 110 may be formatted in the mixed-crypto format including, but not limited to, a registration request message, a temporary node-identifier, an identification of a temporary slot, other identification information (e.g., a nonce), digital certificates, and acknowledgement messages.

When TDMA is used as the contention-free communication protocol, the maximum amount of information that may be transmitted in one time slot is determined from the channel bit rate and the duration of the time slot. As such, in one embodiment, where a mixed-crypto message exchanged between the registering node 302 and the master node 110 is larger than that maximum, the message is divided into smaller message "blocks." In one embodiment, the message blocks are independently distributed by the node transmitting the message (e.g., either the master node 110 or the registering node 302) using different time slots, and are reassembled at the node receiving the message (e.g., either the registering node 302 or the master node 110), to recover the complete message.

Each such mixed-crypto message block may include several fields, such as, for example, pilot information, message distribution management information, and message data. These fields may be distinguished from one another by defining each field type and its length. In greater detail, the pilot information field of a mixed-crypto block, transmitted by, for example, the registering node 302, may include: (i) framing bits, which may be used by the master node 110 to synchronize to the message stream; (ii) "Encrypted Byte Count" bits, which may indicate the number of encrypted bytes, following the pilot information field, in the block, (iii) the node ID of the registering node 302; (iv) status information bits, which may indicate the configuration of the registering node 302 and the health of the user of the registering node 302; (v) geolocation bits, which may use latitude and longitude co-ordinates to identify the location of the registering node 302; and (vi) transmission type bits, which may be used to indicate if the message contained in the block is encrypted and if any status and geolocation bits are present.

The message distribution management information field of a block transmitted by, for example, the registering node 302 may include: (i) "Recently Heard Nodes" bits, which may indicate those nodes in the network 100 from which the registering node 302 has previously received a transmission; and (ii) "Relay for Broadcast" bits, which may indicate the node IDs of the nodes in the network 100 that should retransmit the message block. The message data field of a block transmitted by, for example, the registering node 302 may include: (i) a message block header, which may indicate the block length and the block number in a multiple block message; and (ii) the message data to be transmitted to the master node 110.

In one embodiment, a registration request message transmitted by the registering node 302, in the mixed-crypto format, includes an initial node identifier, for example a default node ID of 255, that identifies the registering node 302 as a registering node. In this registration request message, the "Encrypted Byte Count" bits may be set to zero to indicate that the message is completely unencrypted; the geolocation bits may be set to zero to indicate that the registering node 302 does not have the latitude and longitude co-ordinates of its location, or it does not want to send its location information in an unencrypted form; the status bits may be set to zero to indicate that the registering node 302 does not want to send its status information in an unencrypted form; the "Recently Heard Nodes" and the "Relay for Broadcast" bits may be set to zero; and the message data may include a 32-bit randomly generated nonce, which may distinguish the registering node 302 from other nodes which are trying to register at the same time.

Figure 4:
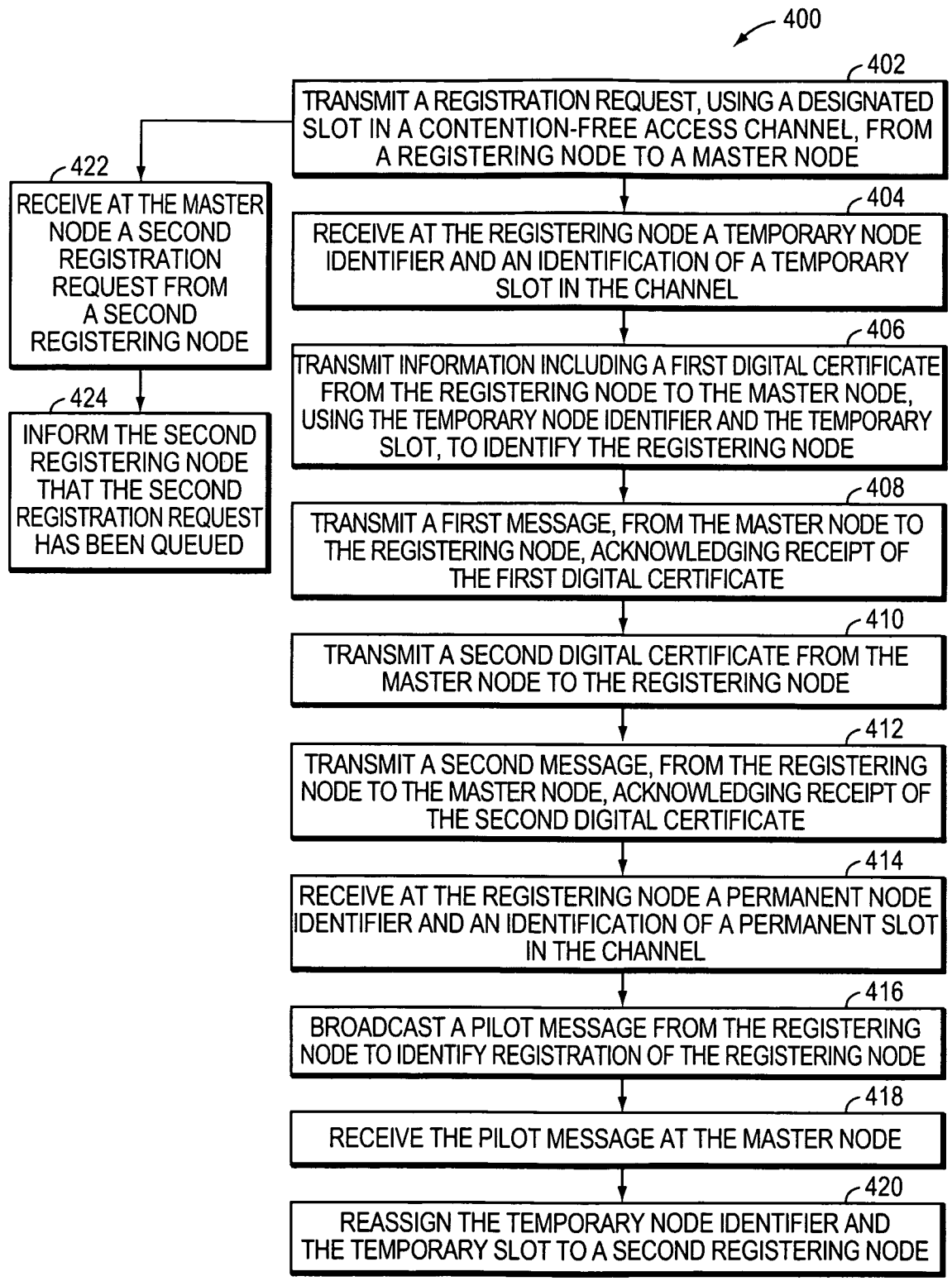
FIG. 4 is a flow diagram of an illustrative embodiment of a method for registering a node in a network in accordance with the invention.

With reference now to FIG. 4, in one embodiment of a method 400 for registering a node in a network, for example in the network 100 depicted in FIG. 3, a registration request is transmitted, using a designated slot in the contention-free access channel, from the registering node 302 to the master node 110 (step 402). A temporary node identifier and a temporary slot in the contention-free access channel are then received at the registering node 302 (step 404), and information (including, for example, a first digital certificate) is transmitted from the registering node 302 to the master node 110, using the temporary node identifier and the temporary slot, to identify the registering node 302 to the master node 110 (step 406). In addition, a first message acknowledging receipt of the first digital certificate may be transmitted from the master node 110 to the registering node 302 (step 408), a second digital certificate may be transmitted from the master node 110 to the registering node 302 (step 410), a second message acknowledging receipt of the second digital certificate may be transmitted from the registering node 302 to the master node 110 (step 412), and a permanent node identifier and an identification of a permanent slot in the contention-free access channel may be received at the registering node 302 (step 414). A pilot message may then be broadcasted from the registering node 302 to the other nodes in the network 100 to identify the registration of the registering node 302 to the network 100 (step 416). The pilot message may be received at the master node 110 (step 418) and the temporary node identifier and the temporary slot may then be reassigned to a second registering node 304 (step 420).

As also illustrated in FIG. 4, where a second registration request is received at the master node 110 from a second registering node 304 while the master node 110 is registering the first registering node 302 to the network 100 (step 422), the second registering node 304 may be informed that the second registration request has been queued (step 424).

In greater detail, and with reference to FIGS. 3 and 4, at step 402 the registering node 302 transmits a registration request message, using a designated slot in the contention-free access channel, to the master node 110. In one embodiment, using the TDMA protocol as an example, the master node 110 designates a time slot for registration request messages and does not allocate that time slot to any node in the network 100. As such, the registering node 302 (or any other node seeking to register with the network 100) may transmit its registration request message to the master node 110 during that time slot. In one embodiment, the registration request message includes the initial node identifier, for example the default node ID of 255 described above, that identifies the registering node 302 as a registering node.

If, for example, the first and second registering nodes 302, 304 both transmit respective registration request messages at the same time, their registration request messages may collide and may not be received by the master node 110. As such, in one embodiment, both the first and second registering nodes 302, 304 wait a specified period of time (which may be different for different registering nodes 302, 304) after having transmitted their respective registration request messages. If, after that specified period of time, a temporary node-identifier and an identification of a temporary time slot are not communicated to the registering node(s) 302, 304 (i.e., step 404 is not performed), the registering node(s) 302, 304 may retransmit its/their respective registration request message(s) to the master node 110. Alternatively, in another embodiment, the master node 110 designates more than one slot, for example four slots, in the contention-free access channel in order to address substantially contemporaneously a registration request from more than one registering node 302, 304.

In one embodiment, the registering node 302 is not in direct communication range of the master node 110, i.e., the registering node 302 does not "neighbor" the master node 110. In such a case, the registering node 302 may transmit the registration request to another node in the network 100 (i.e., to a node that does neighbor the registering node 302), and the registration request may be broadcasted from that other node using, for example, the relay mechanism described above with reference to FIG. 2 until it finally reaches the master node 110. In one embodiment, the relaying of the registration request message is done using the mixed-crypto format described above.

At step 404, as a reply to the registration request, a message that includes a temporary node identifier and that identifies a temporary slot in the channel, for example a time slot in the TDMA channel, is transmitted from the master node 110 to the registering node 302. The reply message may also include a nonce, copied from the registration request that originated from the registering node 302, to indicate that the reply message is for the registering node 302. In one embodiment, as described above, if the reply message is not received at the registering node 302 within a specified period of time, the registering node 302 retransmits the registration request to the master node 110.

At step 406, the registering node 302 uses the temporary node identifier and the temporary slot in the contention-free access channel to transmit information, including a first digital certificate that identifies the registering node 302, to the master node 110. The first digital certificate, where it is large enough, may be transmitted in several message blocks. In one embodiment, if the first digital certificate is not received at the master node 110 within a specified period of time, the master node 110 requests the registering node 302 to retransmit the information comprising the first digital certificate.

In one embodiment, after receiving the first digital certificate, the master node 110 transmits to the registering node 302, at step 408, a message that acknowledges receipt of the first digital certificate. In one such embodiment, a user of the master node 110, for example a commander in a combat operation, is prompted to enter his passcode to decrypt a first private key. The decrypted first private key may then be used to encrypt (e.g., sign) the message that acknowledges receipt of the first digital certificate. In another embodiment, in addition to the first private key, a first public key from the first digital certificate is also used to encrypt the acknowledgement message. The decrypted first private key may then be erased from the master node 110 using a secure erase procedure.

At step 410, the master node 110 may transmit a second digital certificate, identifying the master node 110, to the registering node 302. Again, the second digital certificate, where it is large enough, may be transmitted in several message blocks, and, if the second digital certificate is not received at the registering node 302 within a specified period of time, the registering node 302 may request the master node 110 to retransmit the second digital certificate.

After receiving a complete copy of the second digital certificate from the master node 110, the registering node 302 may transmit to the master node 110, at step 412, a message that acknowledges receipt of the second digital certificate. The registering node 302 may transmit the acknowledgement message using, for example, the temporary node identifier and the temporary slot in the contention-free access channel. In one embodiment, if the master node 110 does not receive the acknowledgement message from the registering node 302 within a specified period of time, the master node 110 requests the registering node 302 to retransmit a message that acknowledges receipt of the second digital certificate.

In one embodiment of step 412, a user of the registering node 302, for example a soldier in a combat operation, is prompted to enter his passcode to decrypt a second private key. The decrypted second private key may then be used to encrypt (e.g., sign) the message that acknowledges receipt of the second digital certificate. In another embodiment, in addition to the second private key, a second public key from the second digital certificate is also used to encrypt that acknowledgement message. Again, the second private key may be erased from the registering node 302 using a secure erase procedure.

At step 414, the master node 110 may check the validity of the message that acknowledges receipt of the second digital certificate. If that acknowledgement message is valid, the master node 110 may transmit to the registering node 302 a further message that includes a permanent node identifier and an identification of a permanent slot in the contention-free access channel. In one embodiment, the master node 110 also transmits a common network key to the registering node 302 so that the registering node 302 may encrypt its transmitted messages in the same manner as other nodes registered to the network 100 encrypt their messages. In such a fashion, each node registered to the network 100 is also able to decrypt a message transmitted from another node registered to the network 100. The master node 110 may then also broadcast a network control message to the nodes in the network 100. The network control message may serve to inform those nodes of the permanent node identifier and the permanent slot that have been assigned to the registering node 302. In one embodiment, if the registering node 302 does not receive the permanent node identifier and the identification of the permanent slot within a specified period of time, the registering node 302 transmits a message to the master node 110 requesting retransmission of the permanent node identifier and the identification of the permanent slot.

At step 416, the registering node 302 may broadcast a pilot message identifying registration of the registering node 302. In one embodiment, the registering node 302 broadcasts the pilot message using the permanent node identifier and the permanent slot in the channel. For example, in an implementation that employs the TDMA protocol, after one or more time cycles the registering node 302 fills-in the "Recently Heard Nodes" bits with the node IDs of the nodes in the network 100 from which the registering node 302 has received messages, and broadcasts a pilot message including the name of the user of the registering node 302, geolocation information for the registering node 302, and status information for the registering node 302.

The master node 110 may receive the pilot message at step 418 and, at step 420, the master node 110 may reassign the temporary node identifier and the temporary slot in the contention-free access channel to a second registering node 304.

As previously mentioned, there may be, in certain situations, one or more other nodes (e.g., node 304) trying to register to the network 100 using the master node 110, while the registration of the registering node 302 is in-process. For example, the master node 110 may receive, at step 422, a second registration request from a second registering node 304 while the first registering node 302 is still registering with the master node 110 to the network 100 (i.e., while any one of steps 402-418 is being performed). In such a case, the master node 110 may queue the second registration request and transmit to the second registering node 304, at step 424, a message informing the second registering node 304 that the second registration request has been queued. Then, after the master node 110 completes registration of the first registering node 302 (i.e., after step 418 of the method 400 is complete), the master node 110 may begin processing the second registration request by transmitting to the second registering node 304 a message that includes the temporary node identifier and an identification of the temporary slot in the contention-free access channel. Steps 404-418 of the method 400 may then be repeated for the second registering node 304.

Synchronization of a Lost Node

In general, in another aspect, various embodiments of the invention feature systems and methods for resynchronizing a node with the network 100. The resynchronizing node may be a user (e.g., a soldier) that moved beyond the communication range of every other node in the network 100, and that desires to resynchronize with the network 100 to recover the messages that it failed to receive (i.e., that it "missed") while it was outside the communication range of the other nodes. In one embodiment, the resynchronizing node receives, via a contention-free access channel, a first message from a supplier node within the network 100. The resynchronizing node may then transmit to the supplier node a resynchronization request that includes a reference to a point in time at which the resynchronizing node lost communication with the network 100. Based on the reference provided in the request, the resynchronizing node may then receive from the supplier node a first missed message.

Figure 5:
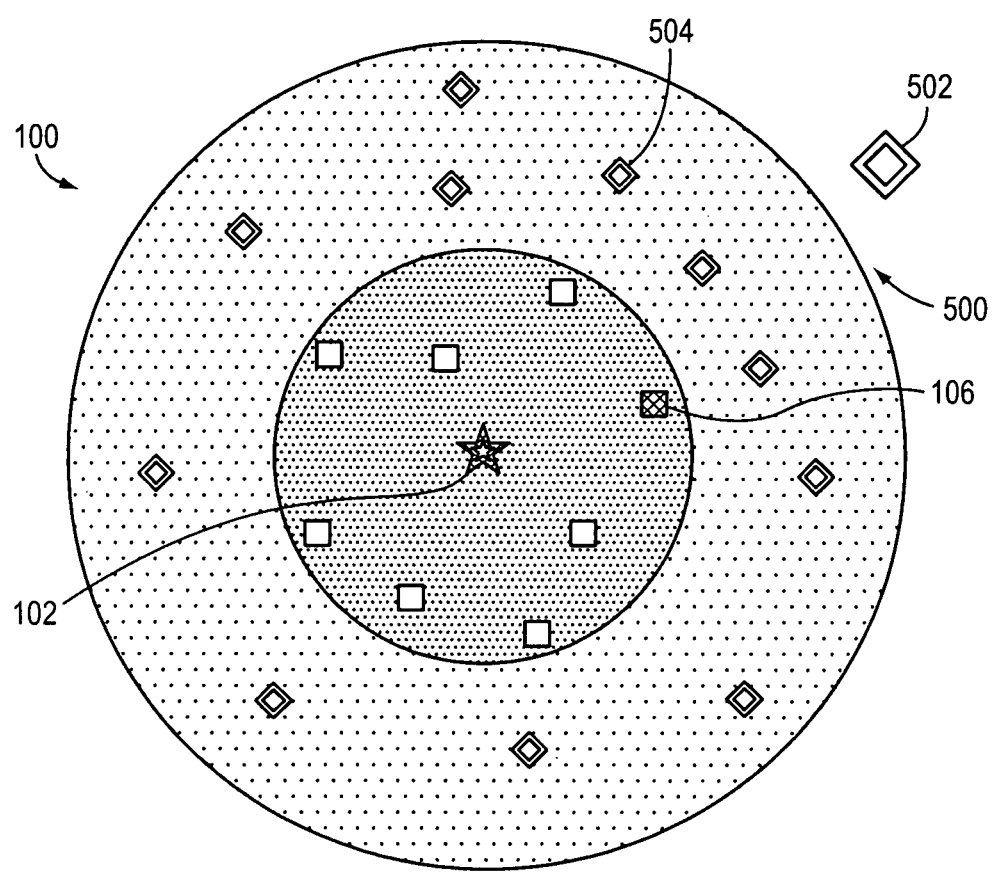
FIG. 5 is a diagram of an illustrative embodiment of a system for resynchronizing a node with a network in accordance with the invention.

FIG. 5 depicts a system 500 for resynchronizing a node with the network 100 in accordance with an illustrative embodiment of the invention. As illustrated, the system 500 may include a resynchronizing node 502 and a supplier node 504. In one embodiment, before the resynchronizing node 502 loses communication with the network 100, the resynchronizing node 502 and the supplier node 504 are two nodes in the network 100 and receive same messages transmitted by, for example, the originating node 102. The resynchronizing node 502 may, however, lose communication with the other nodes in the network 100 because it is at the periphery of the network 100 and stops receiving messages due to noise. In another embodiment, the resynchronizing node 502 moves out of the communication range of the other nodes in the network 100 (e.g, a soldier gets lost in the battlefield) and therefore loses communication with the network 100. Any number of resynchronizing nodes 502 and supplier nodes 504 may be present in the system 500 and network 100.

In one embodiment, the supplier node 504 and/or the resynchronizing node 502 are also relay nodes 106. Accordingly, during the resynchronization process, those nodes may receive a relay request from an originating node 102. In one embodiment, the supplier node 504 and the resynchronizing node 502 deny the relay request and the originating node 102 retransmits the relay directive to other relay nodes 106.

As previously described, the various nodes in the network 100 may communicate with one another through a variety of wireless contention-free access channels, which may be established using a variety of communication protocols. In one embodiment, the supplier node 504 and the resynchronizing node 502 transmit and receive messages on a common radio channel, where access to the channel is managed via a contention-free communication protocol, such as a TDMA protocol, an FDMA protocol, a spatial-division multiple-access protocol, an orthogonal frequency-division multiple access protocol, or any other contention-free communication protocol.

Taking TDMA as an example, before losing communication with the network 100, the resynchronizing node 502 may have been allocated a time slot in the contention-free access channel to communicate with the other nodes in the network 100. In such a case, during resynchronization, the resynchronizing node 502 may use the same time-slot to communicate with the supplier node 504. In one embodiment, the resynchronizing node 502 determines that it has lost communication with the network 100 when it does not receive any messages from any node within the network 100 for a particular number of time cycles.

In one embodiment, during the resynchronization process, the resynchronizing node 502 and/or the supplier node 504 uses a "node sync message" format to transmit and receive messages. The node sync message format may include some "sync" bits in the header of the message to indicate that the message is only meant for either the supplier node 504 or the resynchronizing node 502. The rest of the message format may be same as the format described above for message broadcasting within the network 100.

Figure 6:
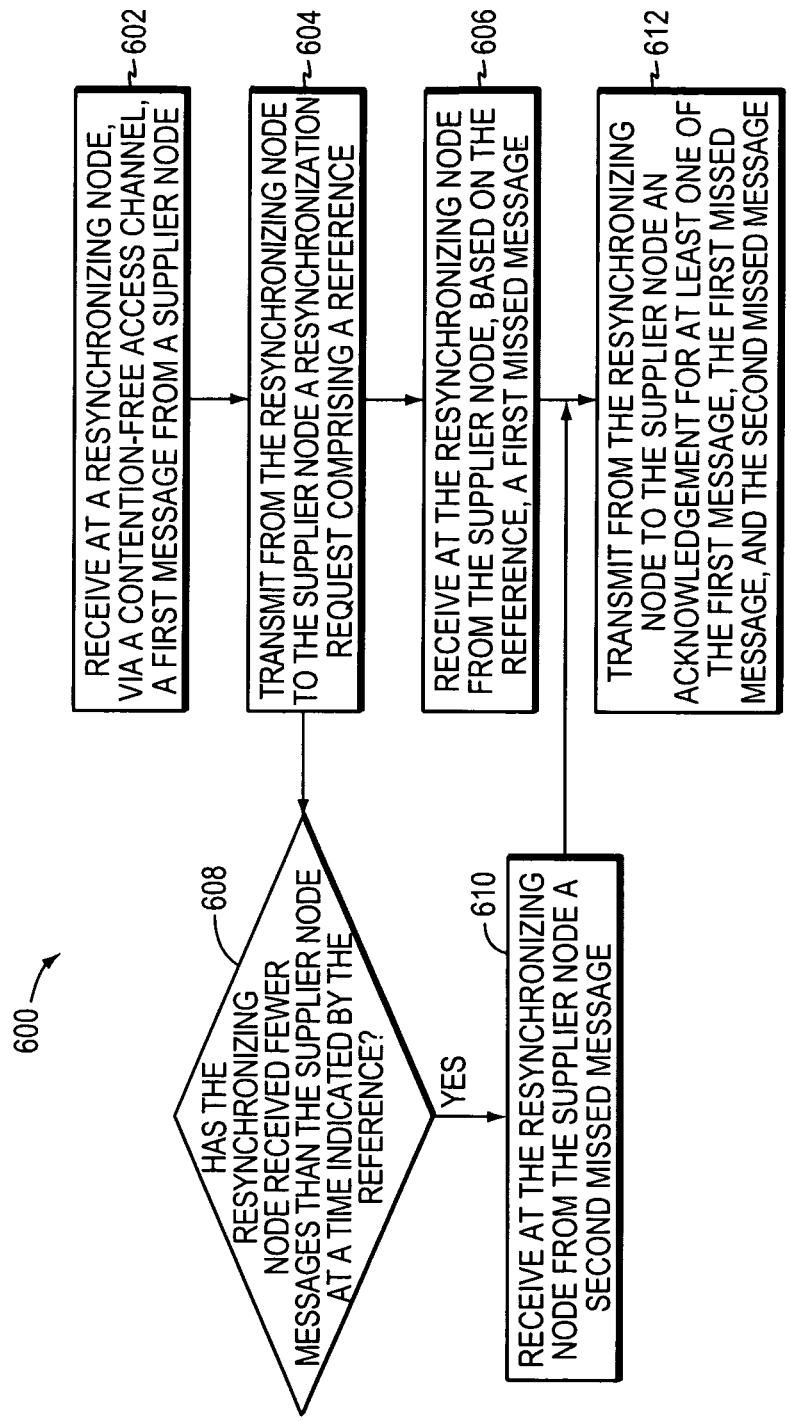
FIG. 6 is a flow diagram of an illustrative embodiment of a method for resynchronizing a node with a network in accordance with the invention.

With reference now to FIG. 6, in one embodiment of a method 600 for resynchronizing a node with the network 100, a first message is received, via a contention-free access channel, at the resynchronizing node 502 from the supplier node 504 (step 602). The resynchronizing node 502 may then transmit to the supplier node 504 a resynchronization request that includes a reference to a point in time at which the resynchronizing node 502 lost communication with the network 100 (step 604). Based on the reference provided in the request, the supplier node 504 may transmit to the resynchronizing node 502 a first missed message (step 606). Optionally, it may be determined (at step 608) that the resynchronizing node 502 had received fewer messages than the supplier node 504 at a time indicated by the reference. If so, the supplier node 504 may transmit to the resynchronizing node 502 a second missed message (step 610). In one embodiment, the resynchronizing node 502 transmits to the supplier node 504 an acknowledgement for at least one of the first message, the first missed message, and the second missed message (step 612).

In greater detail, and with reference to FIGS. 5 and 6, at step 602 the resynchronizing node 502 receives a first message, via a contention-free access channel, from the supplier node 504. For example, with TDMA as the channel access mechanism, the resynchronizing node 502 and the supplier node 504 may be allocated (fixed) time slots to transmit messages. Accordingly, the supplier node 504 may transmit the first message using its allocated time slot. Along with the resynchronizing node 502, the first message may also be received by other nodes within the network 100 that neighbor the supplier node 504.

In one embodiment, prior to receiving the first message, the resynchronizing node 502 broadcasts a pilot message using its allocated time slot. The pilot message may include information that indicates that the resynchronizing node 502 has lost communication with the network 100 and desires to reconnect thereto. The pilot message may be received at the supplier node 504 and at one or more other nodes within the network 100. In one embodiment, the supplier node 504 transmits the first message to the resynchronizing node 502 in response to the received pilot message. After receiving the first message, the resynchronizing node 502 may conclude that it can receive more messages from the supplier node 504 without fail, and may accordingly choose the supplier node 504 for the resynchronization process.

In one embodiment, the resynchronizing node 502 waits for a complete time cycle to determine if there are other nodes within the network 100 from which it can receive messages. If so, the resynchronizing node 502 may use a decision criteria to determine which node to select as the supplier node 504. In one embodiment, the decision criteria includes, but is not limited to, the measured signal strength from the node.

At step 604, after receiving the first message from the supplier node 504, the resynchronizing node 502 may transmit to the supplier node 504 a resynchronization request that includes a reference to a point in time at which the resynchronizing node 502 lost communication with the network 100. In one embodiment, the reference includes a first timestamp that indicates the time of the last message received by the resynchronizing node 502 before it lost communication with the network 100. In another embodiment, the resynchronization request also includes a second timestamp having a time greater than (i.e., later than) a time of the first timestamp. The second timestamp may indicate, for example, the time at which the resynchronizing node 502 received the first message from the supplier node 504. In such a case, the first and second timestamps indicate the period of time during which the resynchronizing node 502 failed to receive messages from nodes within the network 100. As such, the supplier node 504 is able to determine certain messages that are to be provided to the resynchronizing node 502 as part of the resynchronization process. In another embodiment, if the resynchronization request does not include the second timestamp, the supplier node 504 uses the timestamp of the last message that it received in place of the second timestamp.

The resynchronization request may be in the node sync message format. In one embodiment, the resynchronizing node 502 also transmits, for example along with the resynchronization request, an acknowledgement of having received the first message (step 612).

Based on the resynchronization request and the reference included therein, the supplier node 504 transmits a first missed message to the resynchronization node 502 at step 606. In one embodiment, the first missed message is a message that the resynchronization node 502 failed to receive during the time that it failed to communicate with the network 100. In other words, the first missed message may be a message that includes a timestamp having a time between the times of the first and second timestamps. In one embodiment, the resynchronizing node 502 transmits to the supplier node 504 an acknowledgement of having received the first missed message (step 612).

As previously discussed, in one particular embodiment, a copy of all messages transmitted in the network 100 are saved in the receiving nodes. The saved messages may be ordered on the basis of, for example, a parameter that is a combination of the time at which the message was sent, the block number, and the node ID of the node from which the message was transmitted. In one embodiment, the first missed message is one of the messages saved by the supplier node 504.

At step 608, the supplier node 504 may determine whether the resynchronizing node 502 had received fewer messages than the supplier node 504 at a time indicated by the first timestamp. For example, the resynchronizing node 502 may have received the message stamped with the first timestamp from a neighboring node, but failed to receive messages from distant nodes, even though those messages were transmitted before the message stamped with the first timestamp. If so, the supplier node 504 may transmit to the resynchronizing node 502, at step 610, a second missed message. If not (i.e., if the resynchronizing node 502 and the supplier node 504 received the same number of messages up until the point in time indicated by the first timestamp), the method 600 ends.

In one embodiment, to implement steps 608 and 610, a first message count for the resynchronizing node 502 is provided to the supplier node 504. The first message count may be included as part of, for example, the resynchronization request, and may indicate the number of messages that the resynchronizing node 502 received between the initial transmission (e.g., the start of the military operation) and the time indicated by the first timestamp. For its part, the supplier node 504 may itself include a second message count that indicates the number of messages that the supplier node 504 received between the initial transmission and the time indicated by the first timestamp. In one embodiment, the first and second message counts are compared by the supplier node 504. If the first message count is less than the second message count, the supplier node 504 may conclude, at step 608, that the resynchronizing node 502 has not received some of the messages that the supplier node 504 received prior to the point in time indicated by the first timestamp. In such a case, the supplier node 504 may request and receive from the resynchronizing node 502, at step 610, a third timestamp having a time less than (i.e., earlier than) the time indicated by the first timestamp. The third timestamp may be, for example, the timestamp of a message that the resynchronizing node 502 received just prior to having received a message stamped with the first timestamp. In one embodiment, the supplier node 504 then determines whether the resynchronizing node 502 is missing a second message that includes a timestamp having a time between the times of the first and third timestamps. If so, the supplier node 504 transmits that second missed message to the resynchronizing node 502 at step 610. In one embodiment, the resynchronizing node 502 receives more than one second missed message from the supplier node 504. Again, at step 612, the resynchronizing node 502 may transmit to the supplier node 504 an acknowledgement of having received the second missed message.

In one embodiment, steps 608 and 610 are repeated until the message counts of the resynchronizing node 502 and the supplier node 504 are determined by the supplier node 504 to be equal. More specifically, after having made an initial iteration through steps 608 and 610, step 608 is repeated to determine (using message counts) whether the resynchronizing node 502 had received fewer messages than the supplier node 504 at the time indicated by the third timestamp. If not (i.e., the resynchronizing node 502 and the supplier node 504 received the same number of messages up until the point in time indicated by the third time stamp), the method 600 ends. Otherwise, step 610 may again be implemented as described above and further iterations through steps 608 and 610 may continue as necessary.

It should be noted that embodiments of the present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that may be used include C, C++, or JAVA. The software programs may be stored on or in one or more articles of manufacture as object code.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and may exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of distributing messages in a first network, the method comprising:
   transmitting, via a contention-free access channel, a message from an originating node to a first set of nodes neighboring the originating node, the message containing distribution management information designating a subset of the first set of nodes as relay nodes, the subset having fewer nodes than all of the nodes in the first set of nodes;
   checking, by each node in the first set of nodes, the distribution management information to determine which nodes have been designated as relay nodes;
   relaying, via the contention-free access channel, the message by a first one of the relay nodes to a second set of nodes neighboring the first relay node; and
   retransmitting the message from the originating node to the first set of nodes if the message relayed by the first relay node is not received at the originating node.

2. The method of claim 1 further comprising transmitting, from a node in the first set of nodes and for the originating node, an acknowledgement of the message.

3. The method of claim 1 further comprising retransmitting the message from the originating node to the first set of nodes if an acknowledgement from each of the nodes in the first set of nodes is not received at the originating node.

4. The method of claim 1, wherein the contention-free access channel is selected from the group consisting of a time-division multiple-access channel, a frequency- division multiple-access channel, a spatial-division multiple-access channel, and an orthogonal frequency-division multiple-access channel.

5. The method of claim 1, wherein the message is at least one of a node location message, a node status message, a network status message, or an operation change message.

6. The method of claim 1, wherein the message is encrypted.

7. The method of claim 1, wherein the first network comprises the originating node, the first set of nodes, and the second set of nodes.

8. The method of claim 7, wherein the first network is selected from the group consisting of a mobile ad hoc network and a broadcast local area network.

9. The method of claim 7 further comprising managing the first network with a master node.

10. The method of claim 9 further comprising managing the first network with a deputy node when the master node fails to communicate with other nodes in the first network.

11. The method of claim 7 further comprising communicating with a second network through a gateway node in the first network.

12. The method of claim 7 further comprising removing from the first network a node in the first set of nodes.

13. A network for distributing messages, comprising:
   a first set of nodes; and
   an originating node for transmitting, via a contention-free access channel, a message to the first set of nodes, the first set of nodes neighboring the originating node, the message containing distribution management information designating a subset of the first set of nodes as relay nodes, the subset having fewer nodes than all of the nodes in the first set of nodes,
   wherein each node in the first set of nodes is configured to check the distribution management information to determine which nodes have been designated as relay nodes and a first one of the relay nodes is configured to relay, via the contention-free access channel, the message to a second set of nodes neighboring the first relay node; and
   wherein the originating node is further configured to retransmit the message to the first set of nodes if the message relayed by the first relay node is not received at the originating node.

14. The network of claim 13, wherein a node in the first set of nodes is configured to transmit an acknowledgement of the message to the originating node.

15. The network of claim 13, wherein the originating node is further configured to retransmit the message to the first set of nodes if an acknowledgement from each node in the first set of nodes is not received at the originating node.

16. The network of claim 13, wherein the contention-free access channel is selected from the group consisting of a time-division multiple-access channel, a frequency- division multiple-access channel, a spatial-division multiple-access channel, and an orthogonal frequency-division multiple-access channel.

17. The network of claim 13, wherein the message is at least one of a node location message, a node status message, a network status message, or an operation change message.

18. The network of claim 13, wherein the message is encrypted.

19. The network of claim 13, wherein the network is selected from the group consisting of a mobile ad hoc network and a broadcast local area network.

20. The network of claim 13 further comprising a master node for managing the network.

21. The network of claim 20 further comprising a deputy node for managing the network if the master node fails to communicate with other nodes in the network.

22. The network of claim 13 further comprising a gateway node for communicating with a second network.

* * * * *